United States Patent
Schulein, Jr.

(10) Patent No.: US 6,955,136 B2
(45) Date of Patent: Oct. 18, 2005

(54) METHOD FOR INCORPORATING BAKING SODA INTO KITTY LITTER BOX LINER AND LINER

(75) Inventor: Benjamin M. Schulein, Jr., St. Louis, MO (US)

(73) Assignee: Alfa-Pet, Inc., St. Louis, MO (US)

( * ) Notice: Subject to any disclaimer, the term of this patent is extended or adjusted under 35 U.S.C. 154(b) by 0 days.

(21) Appl. No.: 10/710,054

(22) Filed: Jun. 15, 2004

(65) Prior Publication Data

US 2004/0244709 A1 Dec. 9, 2004

Related U.S. Application Data

(63) Continuation-in-part of application No. 10/406,534, filed on Apr. 3, 2003.
(60) Provisional application No. 60/371,809, filed on Apr. 11, 2002.

(51) Int. Cl.$^7$ .................................................. A01K 1/01
(52) U.S. Cl. ....................................................... 119/171
(58) Field of Search ............................... 119/171, 172, 119/173; 383/116; 428/35.5

(56) References Cited

U.S. PATENT DOCUMENTS

| | | | |
|---|---|---|---|
| 4,494,482 A | | 1/1985 | Arnold |
| 4,640,225 A | | 2/1987 | Yananton |
| 4,757,099 A | * | 7/1988 | Hoshino et al. ............. 523/102 |
| 4,852,518 A | | 8/1989 | Yananton |
| 5,007,375 A | * | 4/1991 | Paciullo ....................... 119/170 |
| 5,193,488 A | | 3/1993 | Walton |
| 5,630,377 A | | 5/1997 | Kumlin |
| 5,715,772 A | | 2/1998 | Kamrath et al. |

FOREIGN PATENT DOCUMENTS

| | | | |
|---|---|---|---|
| GB | 2218997 A | * | 11/1989 |
| JP | 02277455 A | * | 11/1990 |
| JP | 09215734 A | * | 8/1997 |

* cited by examiner

Primary Examiner—Yvonne R. Abbott
(74) Attorney, Agent, or Firm—Blackwell Sanders Peper Martin LLP

(57) ABSTRACT

A liner and method of making an animal litter box liner that has a sufficient amount of sodium bicarbonate incorporated into the sheet-like material of the liner to facilitate the control of odors from the litter box when the litter box is used by an animal. The amount of sodium bicarbonate used is small enough that it does not compromise the structural integrity of the liner. The method includes forming first pellets of a first plastic and deodorant. The first pellets are mixed with second pellets and extruded and then formed into liners.

13 Claims, 3 Drawing Sheets

METHOD FOR INCORPORATING BAKING SODA INTO KITTY LITTER BOX LINER AND LINER

CROSS REFERENCE TO RELATED APPLICATIONS

This application is a Continuation-in-Part application of U.S. patent application Ser. No. 10/406,534 filed Apr. 3, 2003, the disclosure of which is incorporated herein by reference.

BACKGROUND OF INVENTION

The present invention relates generally to container liners such as an animal litter box liners, and, more particularly, to a cat litter box liner having sodium bicarbonate incorporated into the material thereof.

The use of sodium bicarbonate ("baking soda") to reduce or eliminate odors of various kinds, such as food odors, is well known. Previously, there have been trashcan liners that have been coated with baking soda for reduction of garbage odors. Also, patents have issued for devices that use sodium bicarbonate for odor control generally. These include U.S. Pat. No. 5,254,401, issued to Kelch et al., which discloses a packaging material for controlled atmosphere packaging. The package is primarily directed at storage of produce and includes a blowing agent containing sodium bicarbonate in an adhesive layer of a liner.

Other patents have issued related specifically to odors created by pets in their use of litter for purposes of defecation and urination. For example, U.S. Pat. No. 4,203,388, which issued to Cortigene et al, discloses an animal litter specifically incorporating sodium bicarbonate in the litter material as a deodorant.

More broadly, U.S. Pat. No. 5,630,377 discloses a pet toilet assembly having bundles of strips formed of recycled newspaper that is capable of being chemically treated with deodorants, germicidal agents, etc. Kamrath et al. were issued U.S. Pat. No. 5,715,772, which discloses a pad for use in a pet carrier and has an optional deodorizer and disinfectant applied to the absorbent layer to neutralize odors from the animal waste. Thus a need has long existed for means by which to deodorize animal litter boxes, but until this time it has never been suggested to actually incorporate sodium bicarbonate as a deodorizer directly into the material from which the box liner is formed; that is, not as a coating or a layer, but as actually part of the liner material per se.

SUMMARY OF INVENTION

The present invention addresses such a need by introducing a sufficient amount of baking soda into the plastic sheet material of a container liner such as a litter box liner during manufacture thereof to thereby reduce or eliminate odors that ordinarily emanate from a utilized liner. The amount of sodium bicarbonate and its method of incorporation into the liners is controlled so as to avoid risk to the structural integrity of the liner. It is intended that the new liner reduce cat box odors but not break under the weight of litter therein, especially when the litter is wet with urine. It is further intended that the new litter box liners are inexpensive and easy to manufacture.

Thus, in keeping with the above goals of the invention, the present invention is, briefly, a container liner having a sufficient amount of sodium bicarbonate incorporated into the material of the liner and method of manufacture to facilitate control of odors from the container contents such as a litter box when the litter box is used by an animal, yet which does not interfere with the structural integrity of the liner to such an extent that the usefulness of the liner is jeopardized.

DETAILED DESCRIPTION

Figure 1:
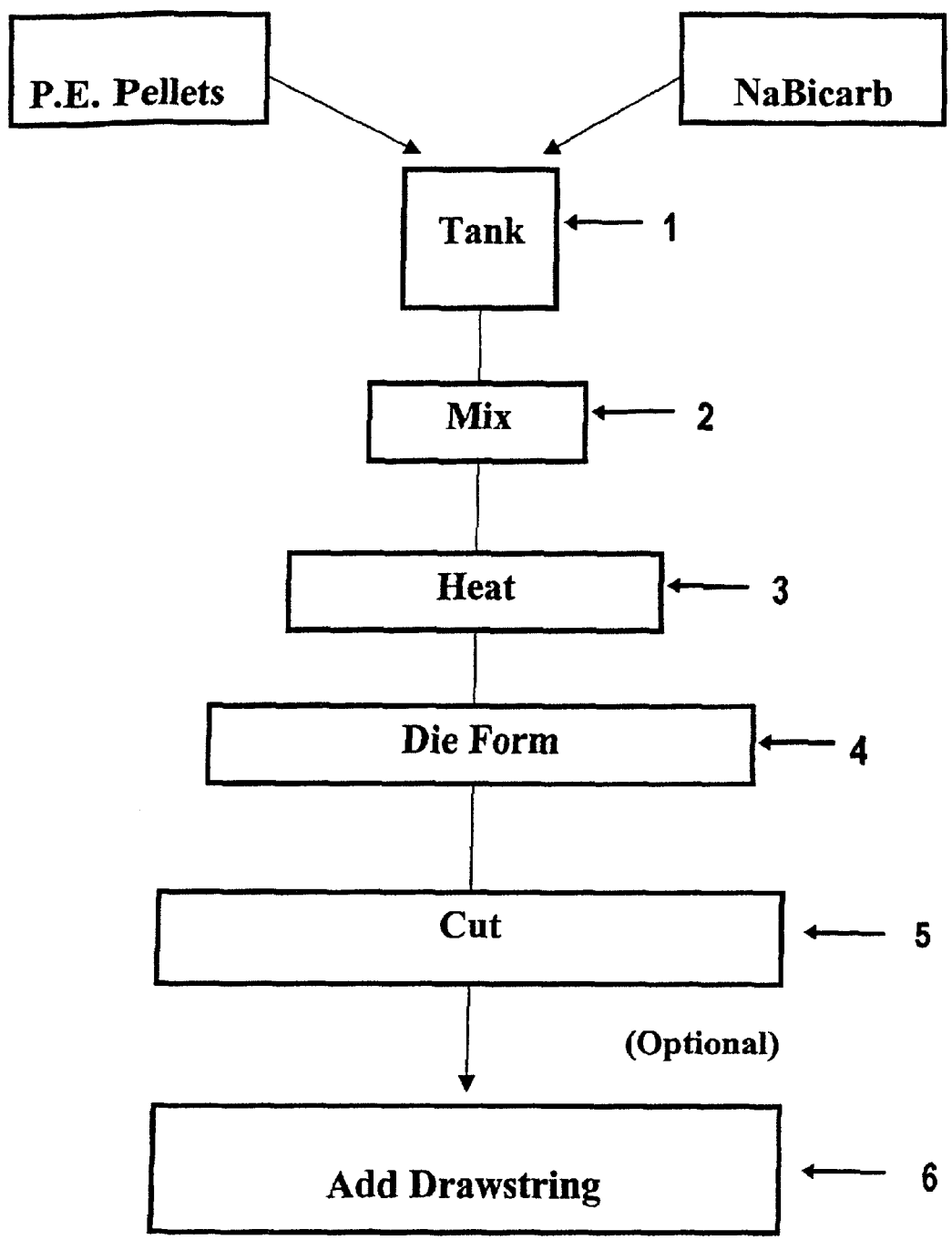
FIG. 1 is a schematic view of the process of forming the new liners.

The liners such as litter box liners 11 of the present invention are manufactured, in part, in keeping with conventional methods including melting plastic pellets and forming the liquid plastic into sheets of predetermined thickness, then cutting the sheets to a predetermined size. The method is illustrated schematically in FIG. 1. If desired a drawstring 59 can be incorporated into a hem 57 around the perimeter of the liner for use in facile closure of the liner after use is completed.

The novel aspect of the new liners is the incorporation of baking soda directly into the plastic material (preferably polyethylene) before forming the sheets of material from which the liners are cut. This is accomplished by combining a predetermined amount of baking soda with an appropriate amount of plastic pellets. The mixture of sodium bicarbonate and plastic pellets is thoroughly melted and mixed, so as to be substantially homogenous prior to forming the plastic sheeting from which the liners are cut. Thus the liner material is thoroughly impregnated throughout its substance with sodium bicarbonate. The preferred amount of sodium bicarbonate is about 2% to about 12% by volume, with an especially preferred amount of about 7% to about 8% by volume. Though various methods may exist for combining the baking soda with plastic pellets and subsequently producing sheets therefrom, a first method is provided in the example below. Any other suitable method may be used.

EXAMPLE

To produce sodium bicarbonate-impregnated plastic sheets for making litter box liners in accordance with the teachings of the present invention, 1400 kgs high-density polyethylene (HDPE) pellets were combined in a tank with 100 kgs sodium bicarbonate. The HDPE and sodium bicarbonate were thoroughly mixed and the resulting mixture fed into a heating drum and die for sheet making. The resulting sheet liners can be cut to any desired size.

Although HDPE is used in the example above, low-density polyethylene (LDPE) may also be used. The resulting sheets are formed preferably in the range of from about 1.0 to about 3.0 mil of either HDPE or LDPE. Any other suitable strength of HDPE or LDPE may be used. Further, any other plastic, such as polypropylene or polyvinyl chloride, or suitable non-plastic material may be used.

As noted above, the sodium-bicarbonate impregnated sheets may be cut to any desirable size. Preferably, the sheets are cut to a size of at least 14 inches by 30 inches.

The new liner 11 has a relatively conventional appearance like any other cat box liner. It may be a flat sheet or provided with a drawstring in a hem or gusset in known manner. Moreover, the liner may be formed of either high or low density polyethylene, and the size (usually at least 14 inches by at least 30 inches) and general shape of the liner may vary in any manner desired, as the invention resides in the chemical make up of the liner sheeting material per se, rather in the structure or shape of the liner.

The function of the invention is dual in that it reduces odor and simultaneously provides a way to keep a litter box clean and sanitary with a single device. The new liner 11 accomplishes both functions without the necessary addition of expensive substance-enhanced litters. Because of the incorporation of baking soda directly into the liner material per se, generic, unsupplemented animal litters can be used without build up of extremely objectionable odors from, for example, cat urine.

Figure 2:
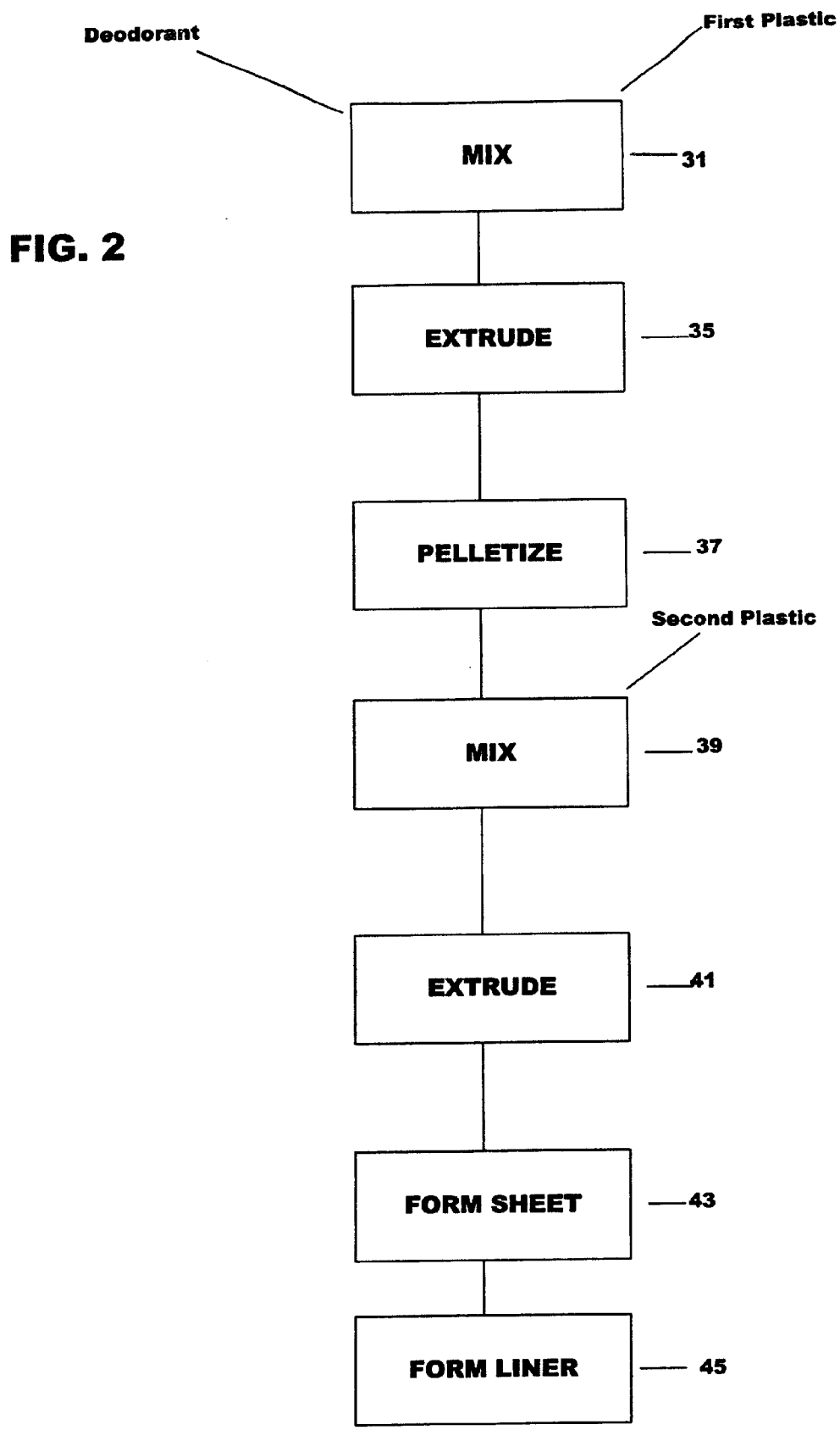
FIG. 2 is a schematic view of an alternate embodiment of a process of forming container liners.
Figure 3:
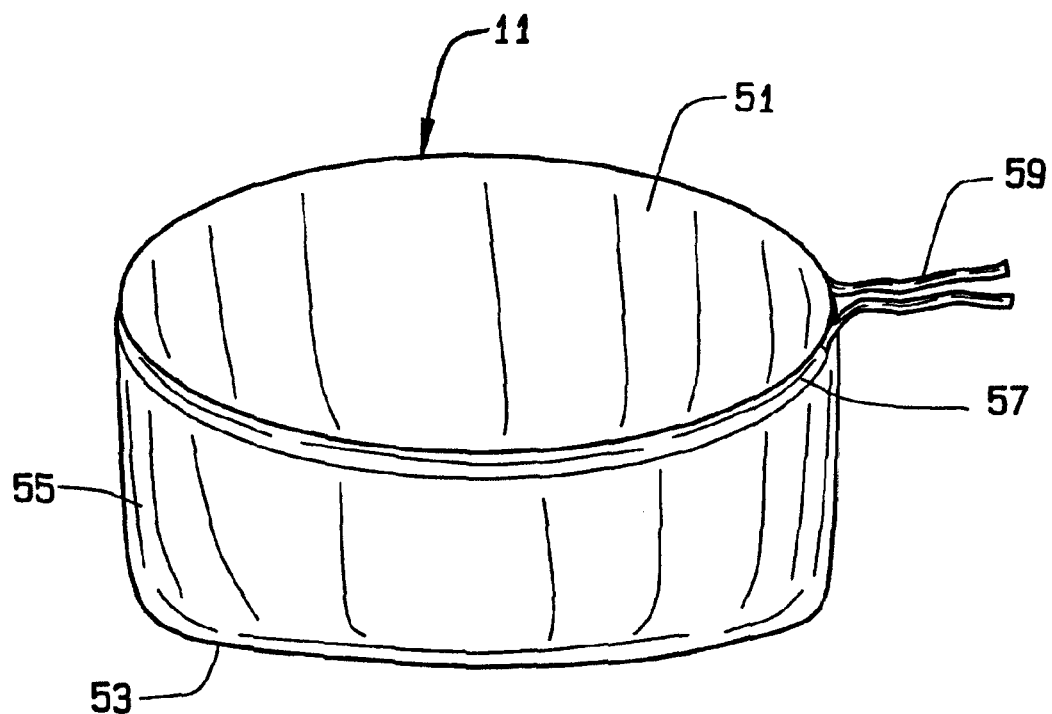
FIG. 3 is a perspective view of a liner.
Figure 4:
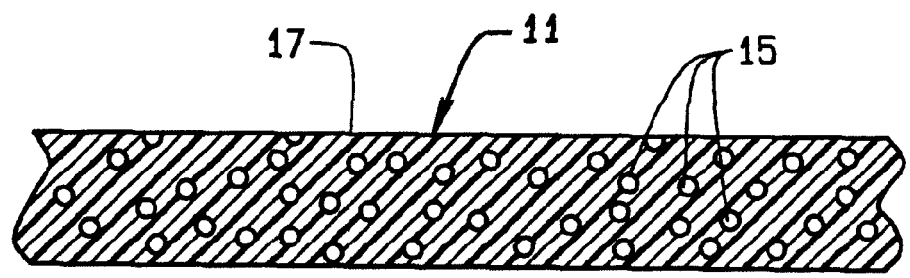
FIG. 4 is a fragmentary sectional view of a portion of a liner.

As seen in FIG. 2, an alternate and preferred embodiment for making a liner 11, FIG. 3, is provided. FIG. 4 illustrates a fragmentary cross sectional view of the liner 11 showing the deodorant 15 disbursed within the plastic or polymer 17 of liner. Generally, the liner 11 is formed by mixing the deodorant 15 which is preferably sodium bicarbonate in particulate form. Preferably, the sodium bicarbonate is a very finely divided particulate and is in the form of a powder, as is well known in the art. The deodorant 15 is mixed 31 with a first plastic and formed into an extrudate by extrusion 35 and then pelletized 37 as by cutting the extrudate as it exits the extruder. Pelletizing is well known in the art of extrusion. The first pellets contain a mixture of first plastic and deodorant. The first pellets containing deodorant are then mixed with second pellets formed of a second plastic or polymer. The first and second pellets are mixed together 39 in the correct proportions to provide the desired amount of deodorant in the ultimately formed liner 11. The mixture of first and second pellets is heated to a temperature to permit the extrusion 41 of the first and second pellets to form a new extrudate of combined first pellets, second pellets and deodorant. Extrusion is achieved by pressurizing the mixed and heated pellets, preferably in an extruder such as a screw extruder. A second extrudate is formed from the pressurized and heated first and second pellets with the extrudate being of a configuration, shape and size for subsequent forming into material for forming a container liner as, for example, a litter box liner. The extrudate may be formed 43 as a sheet. The thus formed extrudate may be then stretched to the desired thickness, if too thick, to reduce the thickness of the extrudate to form a thinner sheet for forming 45 the liner 11. The stretching may be accomplished by a blowing process in which the extrudate is in annular sheet or tube form which is expanded by pressurizing the hollow interior of the extrudate such extrudates are in the form of a tubular parison. The extrudate may be in the form of a generally flat sheet that may be stretched by a stretching apparatus that is well known in the industry of plastic sheet forming.

The first pellets are formed by mixing the deodorant, preferably sodium bicarbonate, with a first plastic material to form first plastic pellets. The sodium bicarbonate is mixed with the first plastic in a weight range of between about 30% of that 70% percent by weight of first plastic. The mixture of plastic and deodorant is heated preferably to a temperature to permit the fusion of the plastic together to form an integral extrudate containing plastic and deodorant with deodorant being dispersed throughout the extrudate. The temperature of the plastic will depend upon its melting temperature and is preferably in the range of between about 110° C. and about 135° C. and preferably in the range of between about 110° C. and about 120° C. The thus mixed and heated plastic and deodorant is extruded and formed into pellets for example, as by cutting the extrudate. The preferred plastic to form the first pellets includes LDPE (low density polyethylene).

The first plastic pellets containing the deodorant are then mixed with the second plastic pellets. The plastic comprising the second plastic pellets includes HDPE (high density polyethylene). The first pellets are mixed with the second pellets in an amount to give a final deodorant quantity in the liner in the range between about 2% and about 12% preferably in the range between about 3% and about 8% and most preferably in the range of between about 4% and about 5% by total weight of plastic in the liner. The second pellets have a melting temperature in the range of between about 125° C. and about 150° C. and preferably in the range of between about 130° C. and about 140° C. The second plastic preferably has a higher melting temperature than the first plastic and they are preferably miscible with one another when melted.

The mixture of the first and second plastic pellets is heated, pressurized and extruded. The temperature of the first and second plastic pellets will be determined by the melting temperatures of the first and second plastics. It has been found effective that the temperature of the first and second plastics pellet for extrusion is in the range of between about 125° C. and about 150° C. and preferably in the range of between about 130° C. and about 140° C.

The pressure will be determined by the size of the extrusion orifice and the viscosity of the blend of first and second plastics with the deodorant. Preferably, the orifice forms a generally flat sheet of plastic extrudate containing the mixture of first and second plastics and deodorant. The thus formed extrudate or sheet may be then stretched or otherwise suitably formed to produce a film having generally opposite planar and parallel surfaces having a thickness in the range of between about 0.001 inches and about 0.003 inches and preferably in the range of between about 0.0013 inches and about 0.0018 inches to form a generally flexible sheet from which container liners can be made. Additionally, the extrudate may be in the form of a hollow tubular parison that may be blown to stretch the parison to the desired thickness. In this case, the formed film may be cut to length or may be cut longitudinally to form a generally flat sheet as opposed to a hollow tube. The thus formed plastic film or sheet is then formed into a liner 11 for a container. The liner 11 has an open end 51, a sealed end 53 and a side wall 55. A hem or gusset 57 may be formed to contain a drawstring 59. The size and shape of the liner 11 is selected to accommodate the container into which it will be placed. The dimensions for a litter box liner are as discussed above. However, the liner may be used for other containers such as wastebaskets and trashcans.

The present invention produces a plastic film having impregnated therein a deodorant, preferably sodium bicarbonate, which will absorb odors while providing the structural integrity to maintain an integral container liner to hold and carry the contents within the liner such as cat litter or other odor producing waste.

In view of the foregoing, it will be seen that the several objects of the invention are achieved and other advantages are attained. Although the foregoing includes a description of the best mode contemplated for carrying out the invention, various modifications are conceivable.

As various modifications could be made in the constructions and methods herein without departing from the scope of the invention it is intended that all matter contained in the foregoing description or shown in the accompanying drawing shall be interpreted as illustrative rather than limiting.

What is claimed is:

1. A method of producing a container liner impregnated with particulate deodorant, said method comprising;

mixing particulate deodorant with a first plastic and forming first pellets containing a mixture of the first plastic and deodorant;

mixing the first pellets with second pellets formed of a second plastic;

heating the mixed first and second pellets;

pressurizing the mixed and heated first and second pellets and extruding the mixed and heated first and second pellets to form an extrudate; and forming the thus formed extrudate into a container liner.

2. A method as set forth in claim 1 wherein the deodorant includes sodium bicarbonate.

3. A method as set forth in claim 2 wherein the sodium bicarbonate is present in the liner in the range of between about 2% and about 12% by weight of total plastic in the liner.

4. A method as set forth in claim 3 wherein the sodium bicarbonate is present in the liner in the range of between about 3% and about 8% by weight of total plastic in the liner.

5. A method as set forth in claim 2 wherein the formed container liner is a litter box liner.

6. A litter box liner formed by the method of claim 2.

7. A method as set forth in claim 1 wherein the first plastic including HDPE.

8. A method as set forth in claim 7 wherein the second plastic including LDPE.

9. A method as set forth in claim 1 wherein the mixture of first and second plastics is at a temperature in the range of between about 120° C. and about 150° C. for extruding.

10. A method as set forth in claim 9 wherein the mixture of first and second plastics is at a temperature in the range of between about 130° C. and about 140° C. for extruding.

11. A method of producing a litter box liner impregnated with sodium bicarbonate, said method comprising:

mixing sodium bicarbonate with a first plastic and forming first pellets containing a mixture of first plastic and sodium bicarbonate;

mixing the first pellets with second pellets formed of a second plastic;

heating the first and second pellets to a temperature effective to permit the extrusion of the first and second pellets;

pressurizing the heated and mixed first and second pellets and extruding the mixed and heated first and second pellets to form a sheet; and forming the thus formed sheet into a litter box liner, said liner including at least about 2% sodium bicarbonate by total weight of plastic in the liner.

12. An animal litter box liner comprising:

a sheet of plastic material having deodorant dispersed throughout the sheet;

said plastic material including at least a first plastic having a first melting point and a second plastic having a second melting point higher than the first melting point; and deodorant being present in an amount in the range of between about 2% and about 12% by total weight of plastic.

13. The litter box liner of claim 12 wherein the first melting point being in the range of between about 110° C. and about 135° C. and the second melting point being in the range of between about 125° C. and about 150° C.

* * * * *